March 15, 1955
K. T. MILLER
2,704,000
WIRE STRIPPING TOOL
Filed March 26, 1954
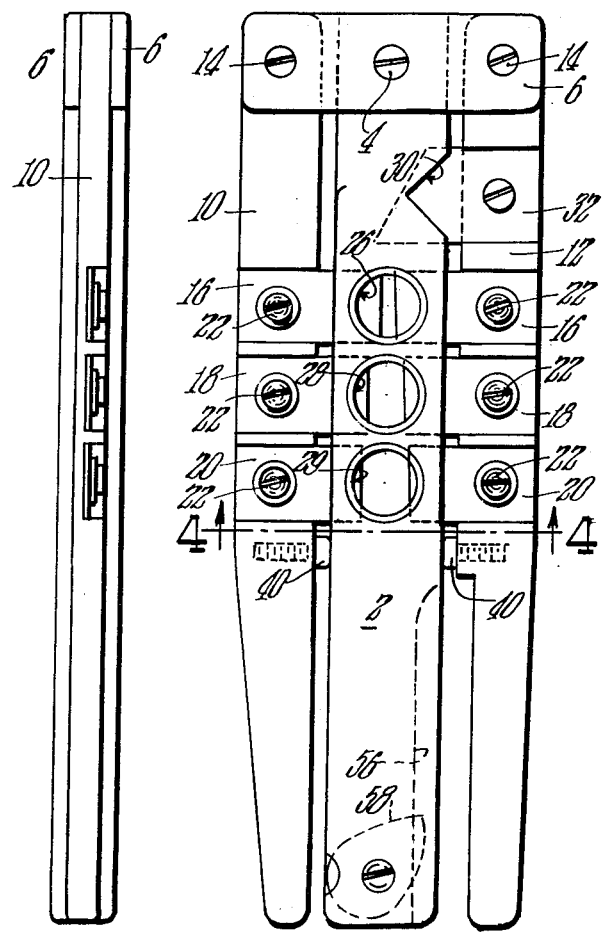
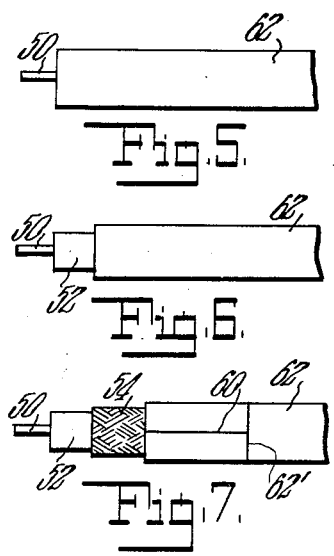
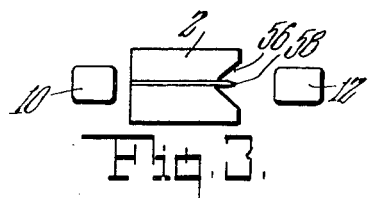
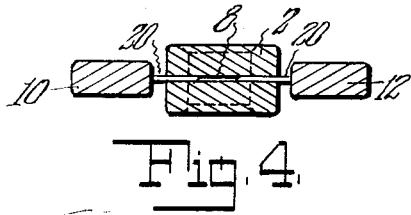
INVENTOR.
Kenneth T. Miller.
BY
Ross & Ross
Atty. & Agent.

United States Patent Office 2,704,000
Patented Mar. 15, 1955

2,704,000

WIRE STRIPPING TOOL

Kenneth T. Miller, Longmeadow, Mass.

Application March 26, 1954, Serial No. 419,065

2 Claims. (Cl. 81—9.5)

This invention relates to improvements in tools and more particularly tools for dressing the end of coaxial cable.

The principal object of the invention is the provision of a tool for guiding the end of a coaxial cable and successively stripping the components thereof in order to dress the same.

All of the above objects, I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are plan and edge views respectively of a tool embodying the novel features of the invention;

Fig. 3 is an end elevational view of the tool shown in Figs. 1 and 2;

Fig. 4 is a sectional view on the line 4—4 of Fig. 1; and

Figs. 5, 6 and 7 are plan views of an end portion of coaxial cable to explain the operation of the tool.

Referring now to the drawings more in detail, the invention will be fully described.

A central elongated frame 2 is secured as by a screw 4 between upper and lower plates 6. The frame is formed to have a slot 8 therethrough, as illustrated in Fig. 4, so as to receive blades as will appear.

Handles 10 and 12 are pivoted between the plates 6 as by screws 14 and these handles each carry cooperating blades 16, 18 and 20. The blades have sharpened inner ends and are secured to the respective handles by screws 22. The blades are slotted longitudinally to permit in and out adjustment thereof.

The frame is provided with holes or guideways 26, 28 and 29 which may be chamfered at outer ends. Said guideways are in alignment with the blades when the handles are in the closed position as shown in Fig. 1.

A notch 30 is provided in a side of the frame 2 and a blade 32 fixed to handle 12 cooperates therewith to sever the coaxial cable when the handle is swung to closed position against the frame.

Stops are provided which may be in the form of screws 40 to limit inner movements of the handles and innermost positions of the cutting edges of the blades.

As is well known, a coaxial cable includes an outer covering, an outer braided conductor inside of the covering, insulation within the braiding, and an inner conductor within the insulation. The inner conductor may consist of a single wire or relatively twisted strands of wire.

The tool may be used in several ways but operates efficiently by opening the handles and first inserting the cable in guideway 26. Blades 16 are set so as to cut through the cable to the inner conductor 50 without nicking it. When the handles are swung to closed position, the cable is rotated in the guideway for complete cutting and the insulation, braid and covering are stripped from the inner conductor, as in Fig. 5.

Next the cable is inserted in guideway 28 and closing of the handles causes blades 18 to cut through the outer covering and braided conductor down to the intulation 52. By rotating the cable the covering and braid are severed and then stripped from the insulation 52, as in Fig. 6.

It may be desired to remove the covering from the braided conductor 54 in which case the cable is inserted in guideway 29 and the blades adjusted to cut nearly through the covering. The cable is rotated to provide a cut therearound and then the cable is laid in groove 56 and drawn along knife 58 to split it so that it may be peeled from the braid 54, as shown in Fig. 7.

Peripheral cut 62' represents a cut around the covering and 60 represents a longitudinal slit made by knife 58 as the cable is drawn along the V groove 56.

The blades may be adjusted in various ways for dressing coaxial cable for securing in various type of fittings. The plurality of guideways permits the adjustment of same to differing dimensions.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A tool for dressing the end of coaxial cable comprising in combination, an elongated frame having upper and lower faces and being provided with a slot for knives extending therethrough from opposite sides and intermediate the faces and with a guideway for cable extending from face to face thereof and intersecting the slot, elongated handles on opposite sides of said frame and being moveable relative thereto and being provided with manually engageable portions for swinging towards and away from the opposite sides of said frame, blades carried by said handles and moveable inwardly toward each other in the slot of said frame and having adjacent inner cutting edges for traversing the guideway and adapted to act on opposite sides of a cable in said guideway.

2. A tool for dressing the end of coaxial cable comprising in combination, an elongated frame having upper and lower faces and being provided with a guideway for cable extending therethrough from face to face thereof and intermediate opposite sides thereof, elongated handles on opposite sides of said frame having manually engageable portions, pivotal connections between corresponding ends of said handles and said frame for the swinging of said handles towards and away from opposite sides of said frame, blades carried by said handles and movable inwardly towards each other as said handles are swung towards said frame and having adjacent inner cutting edges for traversing the guideway and adapted to act on opposite sides of a cable receivable therein.

References Cited in the file of this patent

UNITED STATES PATENTS

| | | |
|---|---|---|
| 2,089,774 | Wachstein | Aug. 10, 1937 |
| 2,306,403 | Mortensen | Dec. 29, 1942 |
| 2,539,776 | Gordon | Jan. 30, 1951 |

FOREIGN PATENTS

| | | |
|---|---|---|
| 10,645 | Denmark | Mar. 16, 1908 |